Oct. 11, 1955

G. LANGE 2,720,140

THREE COMPONENT PHOTOGRAPHIC OBJECTIVE
OF FIVE LENS ELEMENTS

Filed July 14, 1954

United States Patent Office 2,720,140
Patented Oct. 11, 1955

2,720,140
THREE COMPONENT PHOTOGRAPHIC OBJECTIVE OF FIVE LENS ELEMENTS

Günther Lange, Konigsbronn, Wurttemberg, Germany, assignor to Carl Zeiss, Heidenheim (Brenz), Wurttemberg, Germany Application July 14, 1954, Serial No. 443,260
Claims priority, application Germany July 24, 1953
5 Claims. (Cl. 88—57)

The invention concerns photographic objectives, which consist of five lenses, which are combined into 3 components in such fashion, that the front component is an uncemented collective meniscus, which turns its convex side to the object to be photographed, while the middle component is a dispersive meniscus, which turns its concave side to the immediately following diaphragm, and the rear component shows a collective effect, whereby as well the dispersive middle component as also the collective rear component each consist of two cemented together lenses of opposite refractive power, and whereby further the cement surface of the rear component possesses collective action and turns the concave side to the diaphragm.

In accordance with the invention a favorable effect is obtained on the coma and the astigmatism of the oblique pencils thereby, that one selects the refractive power $(\Delta n/r)$ of the cement surface of the rear component greater than $3/8 \cdot 1/f$, whereby f signifies the focal length of the objective, and thereby, that one at the same time selects the vertex distance between the concave surface of the middle component adjacent to the diaphragm and the cement surface of the rear component greater than $0.15 \cdot f$ but smaller than $0.50 \cdot f$ and thereby that one besides at the same time selects the mid-thickness of the total cemented rear component greater than $0.40 \cdot f \cdot \ddot{O}$ but smaller than $1.00 \cdot f \cdot \ddot{O}$, whereby $\ddot{O}$ signifies the maximal numerical aperture.

Figure 1:
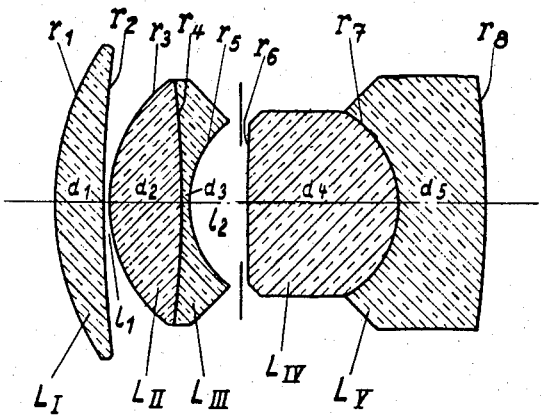
Figure 2:
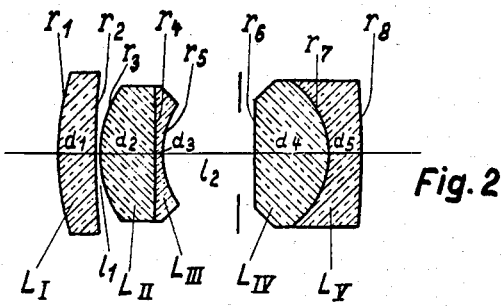
Figure 3:
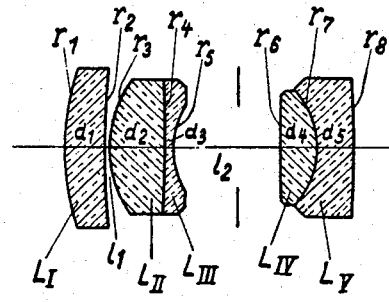
Figure 4:
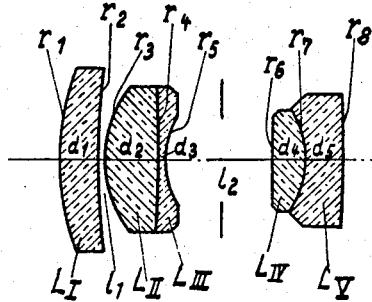

Four examples of objectives in accordance with the invention are represented in the accompanying illustrations, while in the following adduced tables the numerical values for these examples are specified. The Figs. 1 to 4 correspond to the Examples I to IV. The method of reducing the errors of coma and astigmatism of the oblique pencils is illustrated by the following four examples shown diagrammatically in Figures 1, 2, 3 and 4 respectively of the appended drawing.

In the figures and the examples are designated: with $r$, the radii; with $d$, the thicknesses; and with $l$, the distances of the individual components.

The values are referred to the focal length $f=1$. Example I has a relative aperture of $\ddot{O}=1:2$ and covers an image angle of $\pm 23°$. The corresponding values for the other examples are Example II: $\ddot{O}=1:3.5$; image angle $\pm 15°$;
Example III: $\ddot{O}=1:4$; image angle $\pm 14°$;
Example IV: $\ddot{O}=1:4.8$; image angle $\pm 14°$.

Example I

| Lenses | Radii | Thicknesses and distances | $n_d$ | V | $(\Delta n/r)$ |
|---|---|---|---|---|---|
| $L_I$ | $r_1=+0.537042$ | $d_1=0.09204$ | 1.69289 | 52.4 | +1.290197 |
|  | $r_2=+2.33079$ |  |  |  | −0.297277 |
|  | $r_3=+0.297675$ | $l_1=0.00191$ |  |  | +2.092853 |
| $L_{II}$ |  | $d_2=0.13853$ | 1.62299 | 58.1 |  |
| $L_{III}$ | $r_4=−1.90549$ | $d_3=0.01601$ | 1.72342 | 38.0 | −0.052706 |
|  | $r_5=+0.196113$ |  |  |  | −3.688792 |
|  | $r_6=+7.05926$ | $l_2=0.11052$ |  |  | +0.101569 |
| $L_{IV}$ |  | $d_4=0.28963$ | 1.71700 | 47.9 |  |
|  | $r_7=−0.196112$ |  |  |  | +0.475542 |
| $L_V$ | $r_8=−1.40850$ | $d_5=0.17340$ | 1.62374 | 45.0 | +0.442840 |

Example II

| Lenses | Radii | Thicknesses and distances | $n_d$ | V | $(\Delta n/r)$ |
|---|---|---|---|---|---|
| $L_I$ | $r_1=+0.513978$ | $d_1=0.07326$ | 1.67003 | 47.2 | +1.303616 |
|  | $r_2=+1.72163$ |  |  |  | −0.389184 |
|  | $r_3=+0.226305$ | $l_1=0.00166$ |  |  | +2.741477 |
| $L_{II}$ |  | $d_2=0.10689$ | 1.62041 | 60.3 |  |
| $L_{III}$ | $r_4=−5.93534$ | $d_3=0.01498$ | 1.72342 | 38.0 | −0.017355 |
|  | $r_5=+0.160209$ |  |  |  | −4.515477 |
|  | $r_6=+7.26026$ | $l_2=0.17648$ |  |  | +0.096627 |
| $L_{IV}$ | $r_7=−0.172163$ | $d_4=0.14818$ | 1.70154 | 41.1 | +0.569925 |
| $L_V$ | $r_8=−1.72163$ | $d_5=0.06327$ | 1.60342 | 38.0 | +0.350493 |

Example III

| Lenses | Radii | Thicknesses and distances | $n_d$ | V | $(\Delta n/r)$ |
|---|---|---|---|---|---|
| $L_I$ | $r_1=+0.494833$ | $d_1=0.07259$ | 1.66672 | 48.4 | +1.347364 |
|  | $r_2=+1.54246$ |  |  |  | −0.432245 |
|  | $r_3=+0.227492$ | $l_1=0.00165$ |  |  | +2.727173 |
| $L_{II}$ |  | $d_2=0.10558$ | 1.62041 | 60.3 |  |
| $L_{III}$ | $r_4=−2.86392$ | $d_3=0.01485$ | 1.72342 | 38.0 | −0.035968 |
|  | $r_5=+0.161049$ |  |  |  | −4.491925 |
|  | $r_6=+3.50314$ | $l_2=0.20456$ |  |  | +0.200260 |
| $L_{IV}$ | $r_7=−0.171825$ | $d_4=0.07259$ | 1.70154 | 41.1 | +0.582802 |
| $L_V$ | $r_8=−2.48007$ | $d_5=0.06929$ | 1.60140 | 38.3 | +0.242493 |

Example IV

| Lenses | Radii | Thicknesses and distances | $n_d$ | V | $(\Delta n/r)$ |
|---|---|---|---|---|---|
| $L_I$ | $r_1=+0.488067$ | $d_1=0.072611$ | 1.67003 | 47.2 | +1.372824 |
|  | $r_2=+1.478168$ |  |  |  | −0.453284 |
|  | $r_3=+0.227628$ | $l_1=0.001667$ |  |  | +2.725543 |
| $L_{II}$ |  | $d_2=0.105278$ | 1.62041 | 60.3 |  |
| $L_{III}$ | $r_4=−2.211734$ | $d_3=0.013889$ | 1.72342 | 38.0 | −0.046574 |
|  | $r_5=+0.161150$ |  |  |  | −4.489110 |
|  | $r_6=+2.784391$ | $l_2=0.205556$ |  |  | +0.251955 |
| $L_{IV}$ | $r_7=−0.171928$ | $d_4=0.061111$ | 1.70154 | 41.1 | +0.582453 |
| $L_V$ | $r_8=−3.079502$ | $d_5=0.073889$ | 1.60140 | 38.3 | +0.195291 |

I claim:

1. Photographic objective consisting of five lenses, which are combined into three components in such fashion, that the front component is an uncemented collective meniscus, which turns its convex side to the object to be photographed, and that the middle component is a dispersive meniscus, which turns its concave side to the immediately following diaphragm, while the rear component is of collective effect, whereby as well the dispersive middle component as also the collective rear component each consist of two cemented together lenses of opposite refractive power, and whereby further the cement surface of the rear component possesses collective action and turns the concave side to the diaphragm, thereby characterized, that the refractive power $(\Delta n/r)$ at the cement surface of the rear element is greater than $3/8 \cdot 1/f$, whereby f signifies the focal length of the objective, and that the vertex distance between the concave surface of the middle component adjacent to the diaphragm and the cement surface of the rear component is greater than $0.15 \cdot f$ but smaller than $0.50 \cdot f$, and that the midthickness of the cemented rear component is greater than $0.40 \cdot f \cdot Ö$, but smaller than $1.00 \cdot f \cdot Ö$, whereby Ö signifies the maximal numerical aperture, $r$ the radius of curvature of the cement surface in the rear component, $\Delta n$ the difference in refractive index of the cemented lenses of the rear component, and $f$ the equivalent focal length of the objective.

2. Photographic objective according to claim 1, thereby characterized, that the refractive powers ($\Delta n/r$) each deviate at most by $\pm 0.2/f$ and the lens thicknesses ($d$) and the air distances ($l$) each by at most $\pm 0.1 \cdot f$ from the value to be taken from the following numerical example:

| Lenses | Radii | Thicknesses and distances | $n_d$ | V | ($\Delta n/r$) |
|---|---|---|---|---|---|
| $L_I$ | $r_1 = +0.537042 \cdot f$ | $d_1 = 0.09204 \cdot f$ | 1.69289 | 52.4 | $+1.290197 \cdot 1/f$ |
|  | $r_2 = +2.33079 \cdot f$ |  |  |  | $-0.297277 \cdot 1/f$ |
|  |  | $l_1 = 0.00191 \cdot f$ |  |  |  |
|  | $r_3 = +0.297675 \cdot f$ |  |  |  | $+2.092853 \cdot 1/f$ |
| $L_{II}$ |  | $d_2 = 0.13853 \cdot f$ | 1.62299 | 58.1 |  |
| $L_{III}$ | $r_4 = -1.90549 \cdot f$ | $d_3 = 0.01601 \cdot f$ | 1.72342 | 38.0 | $-0.052706 \cdot 1/f$ |
|  | $r_5 = +0.196113 \cdot f$ |  |  |  | $-3.688792 \cdot 1/f$ |
|  |  | $l_2 = 0.11052 \cdot f$ |  |  |  |
|  | $r_6 = +7.05926 \cdot f$ |  |  |  | $+0.101569 \cdot 1/f$ |
| $L_{IV}$ |  | $d_4 = 0.28963 \cdot f$ | 1.71700 | 47.9 |  |
|  | $r_7 = -0.196112 \cdot f$ |  |  |  | $+0.475542 \cdot 1/f$ |
| $L_V$ |  | $d_5 = 0.17340 \cdot f$ | 1.62374 | 45.0 |  |
|  | $r_8 = -1.40850 \cdot f$ |  |  |  | $+0.442840 \cdot 1/f$ | where $L_I$ to $L_V$ refer to the lens elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, $l_1$ and $l_2$ are the axial separations of the lens elements, $n_d$ is the index of refraction with reference to the $d$-line of the spectrum, V is the dispersive index, $\Delta n/r$ is the respective refractive power for each refractive surface $n$ being the difference in refractive index between two adjacent lens elements.

3. Photographic objective according to claim 1, thereby characterized, that the refractive powers ($\Delta n/r$) each deviate at most by $\pm 0.2/f$ and the lens thicknesses ($d$) and the air distances ($l$) each by at most $\pm 0.1 \cdot f$ from the values to be taken from the following numerical example:

| Lenses | Radii | Thicknesses and distances | $n_d$ | V | ($\Delta n/r$) |
|---|---|---|---|---|---|
| $L_I$ | $r_1 = +0.513978 \cdot f$ | $d_1 = 0.07326 \cdot f$ | 1.67003 | 47.2 | $+1.303616 \cdot 1/f$ |
|  | $r_2 = +1.72163 \cdot f$ |  |  |  | $-0.389184 \cdot 1/f$ |
|  |  | $l_1 = 0.00166 \cdot f$ |  |  |  |
|  | $r_3 = +0.226305 \cdot f$ |  |  |  | $+2.741477 \cdot 1/f$ |
| $L_{II}$ |  | $d_2 = 0.10689 \cdot f$ | 1.62041 | 60.3 |  |
| $L_{III}$ | $r_4 = -5.93534 \cdot f$ | $d_3 = 0.01498 \cdot f$ | 1.72342 | 38.0 | $-0.017355 \cdot 1/f$ |
|  | $r_5 = +0.160209 \cdot f$ |  |  |  | $-4.515477 \cdot 1/f$ |
|  |  | $l_2 = 0.17648 \cdot f$ |  |  |  |
|  | $r_6 = +7.26026 \cdot f$ |  |  |  | $+0.096627 \cdot 1/f$ |
| $L_{IV}$ |  | $d_4 = 0.14818 \cdot f$ | 1.70154 | 41.1 |  |
|  | $r_7 = -0.172163 \cdot f$ |  |  |  | $+0.569925 \cdot 1/f$ |
| $L_V$ |  | $d_5 = 0.06327 \cdot f$ | 1.60342 | 38.0 |  |
|  | $r_8 = -1.72163 \cdot f$ |  |  |  | $+0.350493 \cdot 1/f$ | where $L_I$ to $L_V$ refer to the lens elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, $l_1$ and $l_2$ are the axial separations of the lens elements, $n_d$ is the index of refraction with reference to the $d$-line of the spectrum, V is the dispersive index, $\Delta n/r$ is the respective refractive power for each refractive surface $n$ being the difference in refractive index between two adjacent lens elements.

4. Photographic objective according to claim 1, thereby characterized, that the refractive powers ($\Delta n/r$) each deviate at most by $\pm 0.2/f$ and the lens thicknesses ($d$) and the air distances ($l$) each by at most $\pm 0.1 \cdot f$ from the values to be taken from the following numerical example:

| Lenses | Radii | Thicknesses and distances | $n_d$ | V | ($\Delta n/r$) |
|---|---|---|---|---|---|
| $L_I$ | $r_1 = +0.494833 \cdot f$ | $d_1 = 0.07259 \cdot f$ | 1.66672 | 48.4 | $+1.347364 \cdot 1/f$ |
|  | $r_2 = +1.54246 \cdot f$ |  |  |  | $-0.432245 \cdot 1/f$ |
|  |  | $l_1 = 0.00165 \cdot f$ |  |  |  |
|  | $r_3 = +0.227492 \cdot f$ |  |  |  | $+2.727173 \cdot 1/f$ |
| $L_{II}$ |  | $d_2 = 0.10558 \cdot f$ | 1.62041 | 60.3 |  |
| $L_{III}$ | $r_4 = -2.86392 \cdot f$ | $d_3 = 0.01485 \cdot f$ | 1.72342 | 38.0 | $-0.035968 \cdot 1/f$ |
|  | $r_5 = +0.161049 \cdot f$ |  |  |  | $-4.491925 \cdot 1/f$ |
|  |  | $l_2 = 0.20456 \cdot f$ |  |  |  |
|  | $r_6 = +3.50314 \cdot f$ |  |  |  | $+0.200260 \cdot 1/f$ |
| $L_{IV}$ |  | $d_4 = 0.07259 \cdot f$ | 1.70154 | 41.1 |  |
|  | $r_7 = -0.171825 \cdot f$ |  |  |  | $+0.582802 \cdot 1/f$ |
| $L_V$ |  | $d_5 = 0.06929 \cdot f$ | 1.60140 | 38.3 |  |
|  | $r_8 = -2.48007 \cdot f$ |  |  |  | $+0.242493 \cdot 1/f$ | where $L_I$ to $L_V$ refer to the lens elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, $l_1$ and $l_2$ are the axial separations of the lens elements, $n_d$ is the index of refraction with reference to the $d$-line of the spectrum, V is the dispersive index, $\Delta n/r$ is the respective refractive power for each refractive surface $n$ being the difference in refractive index between two adjacent lens elements.

5. Photographic objective according to claim 1, thereby characterized, that the refractive powers ($\Delta n/r$) each deviate at most by $\pm 0.2/f$ and the lens thicknesses ($d$) and the air distances ($l$) each by at most $\pm 0.1 \cdot f$ from the values to be taken from the following numerical example:

| Lenses | Radii | Thicknesses and distances | $n_d$ | V | $(\Delta \bar{n}/r)$ |
|---|---|---|---|---|---|
| $L_I$ | $r_1 = +0.488067 \cdot f$ | $d_1 = 0.072611 \cdot f$ | 1.67003 | 47.2 | $+1.372824 \cdot 1/f$ |
|  | $r_2 = +1.478168 \cdot f$ |  |  |  | $-0.453284 \cdot 1/f$ |
|  |  | $l_1 = 0.001667 \cdot f$ |  |  |  |
| $L_{II}$ | $r_3 = +0.227628 \cdot f$ | $d_2 = 0.105278 \cdot f$ | 1.62041 | 60.3 | $+2.725543 \cdot 1/f$ |
| $L_{III}$ | $r_4 = -2.211734 \cdot f$ | $d_3 = 0.013889 \cdot f$ | 1.72342 | 38.0 | $-0.046574 \cdot 1/f$ |
|  | $r_5 = +0.161150 \cdot f$ |  |  |  | $-4.489110 \cdot 1/f$ |
|  |  | $l_2 = 0.205556 \cdot f$ |  |  |  |
|  | $r_6 = +2.784391 \cdot f$ |  |  |  | $+0.251955 \cdot 1/f$ |
| $L_{IV}$ | $r_7 = -0.171928 \cdot f$ | $d_4 = 0.061111 \cdot f$ | 1.70154 | 41.1 | $+0.582453 \cdot 1/f$ |
| $L_V$ |  | $d_5 = 0.073889 \cdot f$ | 1.60140 | 38.3 |  |
|  | $r_8 = -3.079502 \cdot f$ |  |  |  | $+0.195291 \cdot 1/f$ | where $L_I$ to $L_V$ refer to the lens elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, $l_1$ and $l_2$ are the axial separations of the lens elements, $n_d$ is the index of refraction with reference to the $d$-line of the spectrum, V is the dispersive index, $\Delta n/r$ is the respective refractive power for each refractive surface $n$ being the difference in refractive index between two adjacent lens elements.

References Cited in the file of this patent

UNITED STATES PATENTS

| | | |
|---|---|---|
| 1,880,394 | Altman | Oct. 4, 1932 |
| 1,975,678 | Bertele | Oct. 2, 1934 |
| 2,188,523 | Bertele | Jan. 30, 1940 |
| 2,562,012 | Bertele | July 24, 1951 |
| 2,623,434 | Bechtold | Dec. 30, 1952 |